Figure 1:
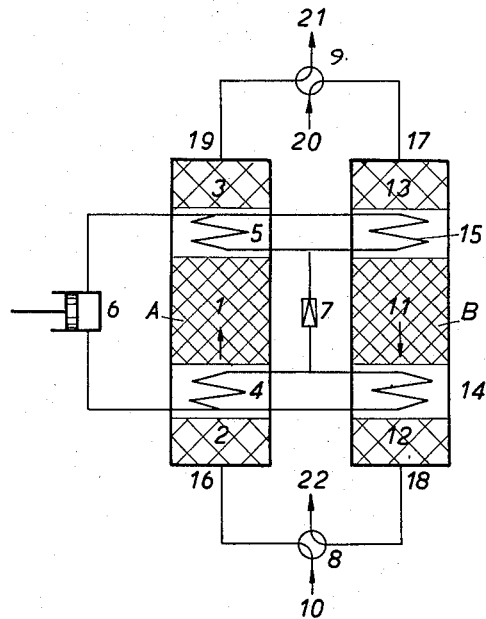

Dec. 8, 1953

H. KAHLE 2,661,808

PROCESS FOR THE PURIFICATION AND
SEPARATION OF GAS MIXTURES

Filed Oct. 10, 1950

2 Sheets-Sheet 1

INVENTOR
HEINRICH KAHLE
By E. Freeman
ATTORNEY

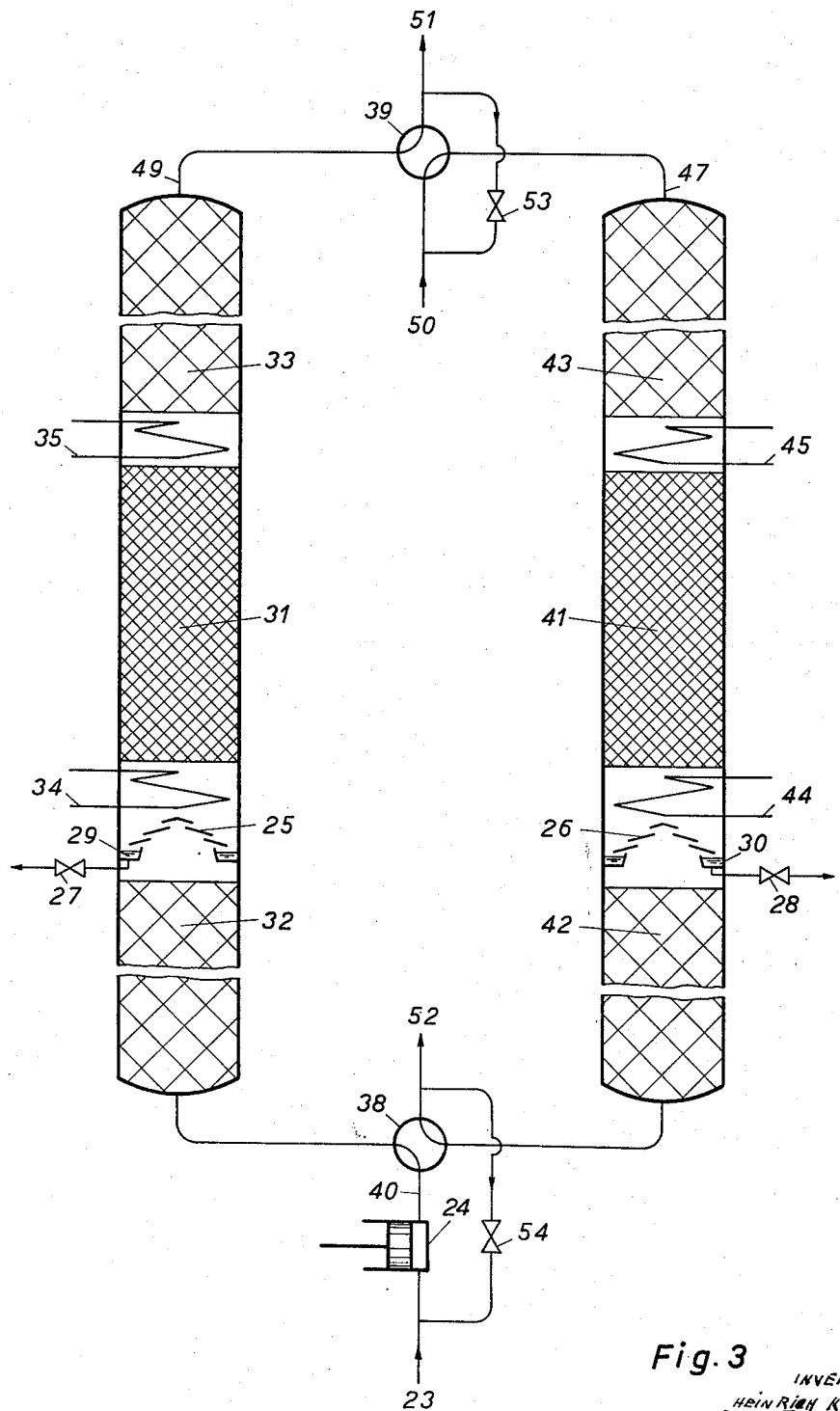

Patented Dec. 8, 1953

2,661,808

UNITED STATES PATENT OFFICE 2,661,808

PROCESS FOR THE PURIFICATION AND SEPARATION OF GAS MIXTURES

Heinrich Kahle, Pullach, near Munich, Germany, assignor to Gesellschaft für Linde's Eismaschinen A.-G., Hoellriegelskreuth, near Munich, Germany Application October 10, 1950, Serial No. 189,329

Claims priority, application Germany October 14, 1949

4 Claims. (Cl. 183—4.7)

The invention relates to a process for the purification and separation of gas mixtures containing adsorptive components and an apparatus for carrying out this process.

The purification and the separation of gas mixtures which contain adsorptive components, is often performed by conducting these gases through one of two adsorbers which are connected in parallel. These adsorbers are alternatively and simultaneously charged and discharged. The charging of the adsorbers with the gas mixture is usually effected at a low temperature and the discharging of the gases at a substantially higher temperature.

It is the primary object of this invention to improve this known process and particularly to attain a more economical utilization of the quantities of heat and cold applied in the course of the same.

In conformity with one embodiment of the invention, an adsorbent material, serving alternately as a cold and a heat accumulating regenerator, is progressively cooled by the fresh gas and loaded with its adsorptive components. Simultaneously, the second adsorber is heated by preheated regenerative gas, passed through the adsorber in an opposite direction to the fresh gas; at the same time, the adsorber is unloaded.

The gas components loaded into the adsorber during the preceding period are taken up by, and at the same time, transferred to the regenerative gas. Since the adsorbent has to act in the one period as a storer of cold and in the next period as a storer of heat, the loading with the fresh gas and the deloading by the regenerative gas is only continued for such a time that the adsorbent will still show a considerable temperature gradient; in other words, the loading is not continued to a point where an equilibrium results and the unloading is not fully completed.

The loading may be effected at a normal or room temperature, or as stated before, the temperature may be lowered by a source of cold.

The adsorbent is loaded by the fresh gas which was previously low-cooled by a suitable cooling source located in the flow direction of the gas in front of the adsorber. In the other adsorber, or adsorber branch, the regenerative branch causing the unloading of the adsorbent is heated by a heating source located at the other end of the adsorber; at the same time, the heat of the regenerative gas is transferred to the adsorbent, and desorbs the adsorbate thereon. The heating and the cooling may be continuously performed.

By the provision of an accumulator or regenerator, or counter-current heat exchanger at each end of an adsorber, or adsorber branch, which either picks up the quantities of cold or heat inherent in the gas, or transfers the same in the manner of an indirect heat exchange, to the fresh, or regenerative gas, cold or heat losses are substantially eliminated. In order to maintain a temperature gradient of the adsorbent a changing over within short periods is necessitated, as customary with the performance of regenerators, and the change-over periods must be controlled in conformity with the temperature conditions of the gas composition and the adsorbent material.

In addition to operative advantages, the substantial economical advantage of reduced energy consumption is achieved by this invention, since the loading may be effected at a normal or a slightly lower temperature. Therefore, cheap sources of cold may be employed and the regeneration or rinsing may be satisfactorily performed at a moderately increased temperature.

If cooling and heating are employed in the process, the loading is effected by pre-cooling the fresh gas in a cold accumulator, cooling it in the cooler to its lowest temperature and conducting it over the adsorbent; the adsorbent is cooled thereby and the gas is preheated. Upon discharge from the adsorbent, the gas is heated in a heater. The adjacent heat accumulator, namely the hot end portion of the branch adsorber receives heat from the heated gas, and the gas is thereby cooled substantially to ambient temperature. The regenerative gas simultaneously flowing in an opposite direction through the other adsorber branch is preheated in the heat accumulator and heated to maximum temperature by the adjacent heating equipment; hereupon, the gas flows through the adsorbent, which is heated and deloaded or desorbed; hereafter the gas is low-cooled in a subsequent cooling device and heated to the temperature of the surrounding atmosphere in an adjacent cold storer. Thus the adsorbent may act as a heat storer during the deloading period, and as a cold storer during the loading period. During the loading period as well as during the deloading period a large temperature drop is maintained across the whole length of the adsorbent. The mean temperature is only lowered during the loading period and only raised during the deloading period.

The adsorbent is not completely heated during the regenerative period. The portions of the adsorber located next to the heater are only slightly loaded. During the deloading period, that portion of the adsorber which is located adjacent to the cooler is not deloaded. Therefore, it is practically only the loading or adsorbing section located in the center portion of the adsorber, which is subjected to adsorption and desorption actions. In this manner, the regenerative gas and the heat applied during the regenerative period, as well as the cold applied during the loading period, are utilized in a very economical manner.

Figure 2:
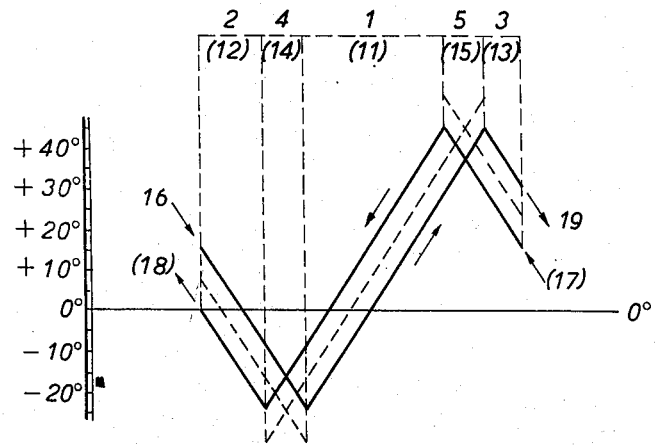

A manner of carrying out the invention is illustrated in the attached drawings, wherein Fig. 1 is a schematic view of the apparatus employed;

Fig. 2 illustrates the temperature conditions of the gas to be purified, of the regenerative gas and of the storage or adsorbent material; and Fig. 3 is a schematic view of apparatus for further treating the regenerative gas.

Two adsorbers, or adsorber branches, A and B are provided. Layers of an adsorbent material are indicated at 1, 11; these layers are connected in parallel with the cooling spirals 4, 14; cold regenerator end portions 2, 12 are located at the one side and heaters 5, 15, as well as heat regenerator end portions 3, 13 at the other side of the adsorbers. Change-over device or valve 8 serves to shift the flow of the fresh gas and of the loaded regenerative gas and a change-over device or valve 9 shifts the flow of the residual and of the fresh regenerative gas. Heating is effected in the heaters 5, 15 by steam or electricity.

In accordance with another embodiment of the invention, the heating and cooling may be combined in such a manner that a cold medium is cyclically heated and cooled by being conducted through a system which consists of compressor 6, liquefier 5 or 15, expansion valve 7, evaporator 4 or 14. The liquefiers 5, 15 serve as a heating source, the evaporators 4, 14 as a cooling source.

The gas purification or separation is performed in the above described apparatus in the following manner.

The fresh gas enters at 10, passes through change-over device 8 and enters, for loading purposes, through tube 16 into the left side adsorber A; it passes through the regenerator 2, which was blown cold in the preceding period, adjacent cooler 4, the adsorbent layer 1, heater 5, heat regenerator 3, and is discharged through tube 19, change-over device 9 and tube 21. Simultaneously, regenerative gas passes from tube 20, through change-over device 9, tube 17, heat regenerator 13, heater 15, adsorbent layer 11, cooler 14, the regenerator 12, tube 18, change-over device 8 and is discharged through tube 22.

The approximate temperature of a gas particle during the commencement of the charging or loading period is illustrated in the schematic Fig. 2, by the line 16—19, the temperature of a regenerative gas particle at the start of the rinsing action by line 17—18; the dotted line passing between the lines 16—19 and 17—18 indicates the temperature in the adsorbent and in the storage material. During the cooling period of the gas, the dotted line passes below and during the heating period above the gas temperature indicating line. The temperature change in 0° C. is apparent from the temperature scale on the left hand side of Fig. 2.

The horizontal line indicates the length of the adsorber from point 16 to 19 and from point 18 to point 17, respectively. The non-bracketed numbers refer to the fresh gas and the residue gas, the bracketed numbers to the regenerative gas.

It appears from Fig. 2 that the temperature of a gas particle, as indicated by the arrow 16 is first lowered in the regenerator 2 and hereupon in the cooler 4; in the adsorbent layer 1 the temperature is raised and this raise continues in heater 5. The temperature then drops.

A regenerative gas particle passing, as indicated by arrow 17, into the second adsorber B in an opposite direction to the before described gas flow is first heated in accumulator 13, the heating is continued in heater 15; however, in the adsorbent layer 11 a drop of the temperature occurs which is continued in cooler 14; hereafter, the temperature rises again to a few degrees above room temperature. The dotted line indicating the temperature of the storage and adsorbent material in the adsorber passes between lines 16—19 and 17—18.

It will thus be seen from Fig. 2 of the drawing that the temperature at each point in the flow path through the apparatus remains approximately constant during both the adsorbing and regenerating phases of the cycle. By the phrase "approximately constant" as used in this specification and the claims, it is meant that each point of the apparatus will have a temperature indicated approximately by the dashed line in Fig. 2, this temperature remaining between the limits set by the two solid lines which indicate the temperature of the gaseous mixture and the regenerative gas respectively. That is, the temperature of the apparatus will deviate from the dashed line toward either of the solid lines, but this deviation will be slight and the temperature of the apparatus will never attain that of the gases indicated by the solid lines.

The operation of the method is different in conformity with its different objects.

If a purification of the gas is intended and a recovery of the impurities is not desired, the rinsing may be effected with any type of regenerative gas. To use increased pressure during the charging or loading period may not be necessary; however, it is recommended, if the gas is to be used further under pressure. If the gas is further separated and products of the separation are obtained, which are not to be utilized, they may be employed for the rinsing of the container which is to be discharged.

A recovery of the adsorptive components may be attained by intensively treating a restricted quantity of the regenerative gas and enriching, in this manner, the adsorbates which were removed during heating and regenerating in a small volume of the sluicing gas.

The enriched regenerative gas may be further enriched or separated in any customary manner, for instance, by fractional condensation and by a further adsorption. When using intensive cooling, it is quite possible to enrich the components to such an extent, that they already condense in the cooling device; from there, they may be discharged continuously, for which purpose suitable collecting vessels should be provided in the vicinity of the point where the condensates form.

An apparatus for carrying out the modified process of the invention as described hereinabove is illustrated in Fig. 3. The two adsorber branches are again each provided with layers of adsorbent material 31 and 41. The cold accumulators 32, 42 are disposed at one end and the heat accumulators 33, 43 at the other end of each adsorber branch. The cooling devices 34, 44 are provided between the cold accumulators 32, 42, and the adsorbent 31, 41, respectively, and the heating devices 35, 45, at the other end of the adsorbent 31, 41. Two change-over devices or valves 38 and 39, are also provided for the two adsorber branches. The devices 25 and 26 serve for deflecting the condensate which falls from or is condensed by the cooling devices 34, 44 and includes the annular collectors 29, 30 and the discharge valves 27, 28 respectively. The compressor 24 is connected to the conduit 23.

The operation of the apparatus of Fig. 3, will now be explained for a specific example. 1500 m.³ of regenerative gas which has been enriched with adsorptive components in a preceding adsorber is charged through conduit 23 to compressor 24, where its pressure is raised slightly above atmospheric pressure. This gas is now forced through conduit 40, valve 38 and through the left-hand adsorber branch, that is, through its cold accumulator 32, through the spaces between the deflector 25, cooling device 34, adsorbent material 31, heating device 35 and heat accumulator 33, and is discharged through conduit 49, valve 39, and conduit 51. Clean regenerative gas, for example, a portion of the compressed and purified gas (obtained from conduit 51) may be fed through valve 53 (for example, 500 m.³), and passed by way of conduit 47 through the other adsorber branch with its heat accumulator 43, heating device 45, adsorbent material 41 from which it picks up desorbed components, cooling device 44, deflector 26, cold accumulator 42 through valve 38 and is discharged from conduit 52 where it may be further utilized or may be returned to the first adsorber stage. Alternatively, the gas may be fed through valve 54 to the compressor 24, so that the amount of gas flowing through the compressor is increased to 2000 m.³.

The condensate which is precipitated by the cooling device 34 and 44, respectively, is deflected by the deflectors 25 and 26 and is collected by the collectors 29 and 30 and may be obtained from the valves 27 and 28.

Since certain changes in carrying out the above process could be made without departing from the scope thereof, it is intended that all matter contained in the above description or shown in the accompanying drawings shall be interpreted as illustrative and not in a limiting sense.

Having thus described the invention, what I claim as new and desire to be secured by Letters Patent, is as follows:

1. An adsorption apparatus comprising a pair of adsorbing means each containing an adsorbent material and adapted to have gases flow therethrough, each of said two adsorbing means having at one end thereof and in flow communication therewith a heating means, a first pair of heat accumulator means each in communication with a respective one of said heating means and for receiving, storing and transferring heat to and from gases flowing therethrough, a pair of cooling means each in communication with a respective one of the opposite ends of said adsorbing means, a second pair of heat accumulator means each in communication with a respective one of said cooling means, an inlet pipe for supplying to said apparatus a gaseous mixture containing components to be adsorbed therefrom, an outlet pipe for delivering from the apparatus said gaseous mixture after the components have been adsorbed therefrom, an inlet pipe for supplying adsorbent-regenerating gas to said apparatus, an outlet pipe for delivering from the apparatus said adsorbent-regenerating gas after the latter has performed its regenerative function, a first valve means selectively operable to connect to said gas mixture inlet pipe either of said heat accumulator means which are in communication with said cooling means, and to connect the other of said last-recited heat accumulator means to said regenerating gas outlet pipe, and a second valve means selectively operable to connect to said regenerating gas inlet pipe either of said pair of heat accumulator means which are in communication with said heating means and to connect the other of said last-recited pair of heat accumulator means to said gas mixture outlet pipe, whereby one of said adsorbing means may alternatively adsorb condensible components from the gaseous mixture or be regenerated while the other adsorbing means alternatively is being regenerated or is adsorbing respectively, the temperature at each point in the flow path through each of said adsorbing means and heat accumulator means remaining approximately constant for both the adsorbing and regenerating phases.

2. An adsorption apparatus comprising a pair of adsorbing means each containing an adsorbent material and adapted to have gases flow therethrough, each of said two adsorbing means having at one end thereof and in flow communication therewith a heating means, a first pair of heat accumulator means each in communication with a respective one of said heating means and for receiving, storing and transferring heat to and from gases flowing therethrough, a pair of cooling means each in communication with a respective one of the opposite ends of said adsorbing means, a second pair of heat accumulator means each in communication with a respective one of said cooling means, an inlet pipe for supplying to said apparatus a gaseous mixture containing components to be adsorbed therefrom, an outlet pipe for delivering from the apparatus said gaseous mixture after the components have been adsorbed therefrom, an inlet pipe for supplying adsorbent-regenerating gas to said apparatus, an outlet pipe for delivering from the apparatus said adsorbent-regenerating gas after the latter has performed its regenerative function, a first valve means selectively operable to connect to said gas mixture inlet pipe either of said heat accumulator means which are in communication with said cooling means and to connect the other of said last-recited heat accumulator means to said regenerating gas outlet pipe, and a second valve means selectively operable to connect to said regenerating gas inlet pipe either of said pair of heat accumulator means which are in communication with said heating means and to connect the other of said last-recited pair of heat accumulator means to said gas mixture outlet pipe, the temperature of each of the heat accumulator means in communication with the cooling means falling throughout its flow path at an approximately constant gradient from the end connected to said first valve means toward the end in communication with the cooling means where the temperature is at its lowest point, the temperature of each of the adsorbing means rising throughout its flow path at an approximately constant gradient from said lowest point toward a highest temperature point at the end of the adsorbing means in communication with the heating means, the temperature of each of the heat accumulator means in communication with the heating means falling throughout its flow path at an approximately constant gradient from said highest temperature point at the end in communication with the heating means toward the end connected to said second valve means, whereby one of said adsorbing means may alternatively adsorb condensible components from the gaseous mixture or be regenerated while simultaneously the other adsorbing means is alternatively being regenerated or adsorbing respectively, the temperatures and gradients of each adsorbing means and its associated heat accumulators remaining approximately constant for both the adsorbing and regenerating phases of the cycle.

3. An adsorption apparatus comprising a pair of adsorbing means each containing an adsorbent material and adapted to have gases flow therethrough, each of said two adsorbing means having at one end thereof and in flow communication therewith a heating means, a first pair of heat accumulator means each in communication with a respective one of said heating means and for receiving, storing and transferring heat to and from gases flowing therethrough, a pair of cooling means each in communication with a respective one of the opposite ends of said adsorbing means, a second pair of heat accumulator means each in communication with a respective one of said cooling means, an inlet pipe for supplying to said apparatus a gaseous mixture containing components to be adsorbed therefrom, an outlet pipe for delivering from the apparatus said gaseous mixture after the components have been adsorbed therefrom, an inlet pipe for supplying adsorbent-regenerating gas to said apparatus, an outlet pipe for delivering from the apparatus said adsorbent-regenerating gas after the latter has performed its regenerative function, a first valve means selectively operable to connect to said gas mixture inlet pipe either of said heat accumulator means which are in communication with said cooling means and to connect the other of said last-recited heat accumulator means to said regenerating gas outlet pipe, and a second valve means selectively operable to connect to said regenerating gas inlet pipe either of said pair of heat accumulator means which are in communication with said heating means and to connect the other of said last-recited pair of heat accumulator means to said gas mixture outlet pipe, whereby one of said adsorbing means may alternatively adsorb condensible components from the gaseous mixture or be regenerated while the other adsorbing means alternatively is being regenerated or is adsorbing respectively, the temperature at each point in the flow path through each of said adsorbing means and heat accumulator means remaining approximately constant for both the adsorbing and regenerating phases and a pair of longitudinal hollow enclosures, each of said adsorbing means and its associated heat accumulator means and heating and cooling means being enclosed within a respective one of said enclosures.

4. A process for the separation of adsorptive components from gaseous mixtures, said process comprising the steps of passing the gaseous mixture through a heat accumulator having a temperature lower than the gaseous mixture to cool the latter and transfer heat to said accumulator, passing the cooled gaseous mixture through a cooling means to further cool the mixture, then passing the latter through an adsorber to condense therein said adsorptive components and to heat said gaseous mixture thereby, then passing the uncondensed gas through a heating means to further heat said uncondensed gas, then passing the latter through a second heat accumulator to heat the said second accumulator and to cool said uncondensed gas, then passing regenerative gas in a direction reversed with respect to the direction of flow of said gaseous mixture through said second heat accumulator so as to be heated thereby, then through said heating means to be further heated, then through said adsorbing means to regenerate the latter and to cool said regenerative gas, and then through said first-recited heat accumulator so as to cool the latter, and then repeating the cycle of operation recited above, all the aforementioned steps being carried out while maintaining the temperature at each point in the flow path through each of said adsorbing means and heat accumulators approximately constant for both the adsorbing and regenerating phases of the cycle.

HEINRICH KAHLE.

References Cited in the file of this patent
UNITED STATES PATENTS

| Number | Name | Date |
|---|---|---|
| 1,548,280 | Ray | Aug. 4, 1925 |
| 1,616,242 | Voress et al. | Feb. 1, 1927 |
| 1,934,075 | Lewis | Nov. 7, 1933 |
| 1,948,779 | Abbott et al. | Feb. 27, 1934 |
| 1,959,389 | Shoosmith | May 22, 1934 |
| 2,083,732 | Moore et al. | June 15, 1937 |
| 2,354,383 | Kiess Kalt | July 25, 1944 |
| 2,535,902 | Dailey, Jr. | Dec. 26, 1950 |